US009637676B2

(12) United States Patent
Leonard et al.

(10) Patent No.: US 9,637,676 B2
(45) Date of Patent: May 2, 2017

(54) ASPHALTENE INHIBITORS FOR SQUEEZE APPLICATIONS

(71) Applicants: Geoffrey C. Leonard, Houston, TX (US); Gordon T. Rivers, Houston, TX (US); Samuel Asomaning, Sugar Land, TX (US); Patrick J. Breen, Houston, TX (US)

(72) Inventors: Geoffrey C. Leonard, Houston, TX (US); Gordon T. Rivers, Houston, TX (US); Samuel Asomaning, Sugar Land, TX (US); Patrick J. Breen, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 433 days.

(21) Appl. No.: 13/746,441

(22) Filed: Jan. 22, 2013

(65) Prior Publication Data
US 2013/0186629 A1    Jul. 25, 2013

Related U.S. Application Data

(60) Provisional application No. 61/590,170, filed on Jan. 24, 2012.

(51) Int. Cl.
C09K 8/52     (2006.01)
E21B 43/25    (2006.01)
C09K 8/524    (2006.01)

(52) U.S. Cl.
CPC .............. *C09K 8/524* (2013.01); *E21B 43/25* (2013.01)

(58) Field of Classification Search
CPC .................................. C09K 8/524; E21B 43/25
See application file for complete search history.

(56) References Cited

U.S. PATENT DOCUMENTS 2,182,208  A      12/1939  Nason
3,279,541  A  *  10/1966  Knox .................... C09K 8/524
                                                                166/300

(Continued)

OTHER PUBLICATIONS

Stephan J. Allenson et al., "A Novel Way to Treat Asphaltene Deposition Problems Found in Oil Production," SPE 37286, SPE Int'l Symposium on Oilfield Chemistry, Houston, Texas (Feb. 18-21, 1997).

(Continued)

*Primary Examiner* — Zakiya W Bates
*Assistant Examiner* — Crystal J Miller
(74) *Attorney, Agent, or Firm* — Mossman Kumar & Tyler PC

(57) ABSTRACT

Reaction products of polymeric alkyl phenol formaldehyde resins are useful as additives to inhibit or prevent the deposition or precipitation of asphaltenes in hydrocarbon fluids, particularly crude oil produced from a subterranean formation. These reaction products are formed by reacting a polymeric alkyl phenol formaldehyde resin with a co-reactant having functional groups including, but not necessarily limited to, amines, esters, silanes, ketones, epoxides, alkoxides, aryloxides, halogens, alkali metals, alkali earth metals, acetamides, non-metal oxides, metal oxides, where the co-reactant optionally has a carbon chain length between 1 and 22 and the reaction is conducted in the presence of at least one of various solvents. In one non-limiting embodiment, the co-reactant is a silicon derivative. The asphaltene inhibitors have utility when injected into a subterranean formation while oil production temporarily halts, a process called "squeezing," because they are retained to a degree in the formation as the crude oil is produced.

13 Claims, 7 Drawing Sheets

Percent Light Transmittance versus Pore Volume for SAI-3 and Conventional AI

Percent Dispersion versus Pore Volume for SAI-3 and Conventional AI

(56) References Cited

U.S. PATENT DOCUMENTS

| | | | | |
|---|---|---|---|---|
| 4,090,562 | A * | 5/1978 | Maly | C09K 8/524 166/304 |
| 4,250,964 | A * | 2/1981 | Jewell | E21B 43/24 166/272.1 |
| 5,021,498 | A | 6/1991 | Stephenson et al. | |
| 5,423,901 | A * | 6/1995 | Mendoza | B01D 17/047 95/154 |
| 5,494,607 | A | 2/1996 | Manek et al. | |
| 5,504,063 | A * | 4/1996 | Becker | C09K 8/524 134/40 |
| 6,051,535 | A | 4/2000 | Bilden et al. | |
| 6,313,367 | B1 | 11/2001 | Breen | |
| 6,939,832 | B2 * | 9/2005 | Collins | C09K 8/52 166/300 |
| 7,754,657 | B2 * | 7/2010 | Trimble | C09K 8/524 507/118 |
| 7,795,183 | B2 * | 9/2010 | Wilkes | C09K 8/524 507/90 |
| 2003/0069143 | A1 * | 4/2003 | Collins | C09K 8/52 507/200 |
| 2006/0065396 | A1 * | 3/2006 | Dawson | C09K 8/508 166/279 |
| 2007/0234637 | A1 * | 10/2007 | Stark | C10L 1/143 44/351 |
| 2008/0020949 | A1 * | 1/2008 | Trimble | C10G 75/00 507/203 |
| 2008/0076840 | A1 * | 3/2008 | Flatt | B01D 17/045 516/144 |
| 2008/0096772 | A1 * | 4/2008 | Wilkes | C09K 8/524 507/90 |
| 2008/0248978 | A1 | 10/2008 | Huang et al. | |
| 2010/0175315 | A1 | 7/2010 | McRobbie et al. | |
| 2011/0098507 | A1 * | 4/2011 | Cohrs | C09K 8/524 568/14 |
| 2011/0203353 | A1 | 8/2011 | Hough et al. | |
| 2011/0250626 | A1 * | 10/2011 | Williams | A01N 63/02 435/18 |

OTHER PUBLICATIONS

Alberto G. Dilullo et al., "A Techno-Economic Feasibility Study of Asphaltene Inhibition Squeeze Treatments," SPE 50656, SPE European Petroleum Conference, The Hague, Netherlands (Oct. 20-22, 1998).

Asomaning, Samuel et al., "Prediction and Solution of Asphaltene Related Problems in the Field," Chemistry in the Oil Industry VII, Royal Society of Chemistry, pp. 133-137 (2002).

Asomaning, Samuel, "Assessing the Performance of Asphaltene Inhibitors Using High Pressure Methods: The Deepwater Gulf of Mexico Experience," Chemistry in the Oil Industry VIII, Royal Society of Chemistry, pp. 35-45 (2003).

Kelland, Malcolm A., "Production Chemicals for the Oil and Gas Industry, Asphaltene Control," Chapt. 4, pp. 111-148, CRC Press (2009).

F. M. Vargas, "Advances in Predicting Asphaltene Deposition and Development of a Novel Strategy for its Mitigation," Abstract to presentation, Rice University, Houston, Texas (Apr. 2, 2013).

* cited by examiner

Percent Light Transmittance versus Pore Volume for SAI-3 and Conventional AI

Percent Dispersion versus Pore Volume for SAI-3 and Conventional AI

Percent Light Transmittance versus Pore Volume for the Squeeze Asphaltene Inhibitors Percent Light Transmittance versus Pore Volume for the Commercial Al, SAI-1, SAI-4, SAI-5, SAI-6, and SAI-7

Percent Light Transmittance and Differential Pressure versus Pore Volume for SAI-1

Percent Light Transmittance and Differential Pressure versus Pore Volume for Conventional Al Percent Light Transmittance versus Pore Volume for the Conventional Al and for SAI-1

ASPHALTENE INHIBITORS FOR SQUEEZE APPLICATIONS

CROSS-REFERENCE TO RELATED APPLICATION

This application claims the benefit of U.S. Provisional Patent Application No. 61/590,170 filed Jan. 24, 2012, incorporated by reference herein in its entirety.

TECHNICAL FIELD

The invention relates to methods and compositions for inhibiting and preventing the deposition or precipitation of asphaltenes present in hydrocarbon fluids, such as crude oils, and most particularly relates, in one non-limiting embodiment, to methods and compositions for inhibiting and preventing the deposition or precipitation of asphaltenes present in crude oils by using reaction products of polymeric alkyl phenol formaldehyde resins as asphaltene inhibitors.

TECHNICAL BACKGROUND

Subterranean hydrocarbon reservoir oil is typically characterized in terms of four compositional fractions—saturates (saturated hydrocarbons), aromatics, resins, and asphaltenes. Asphaltenes may be defined as the organic part of crude oil that is not soluble in straight-chain solvents such as pentane or heptane. Asphaltenes that are soluble in the bulk oil at relatively high pressures may precipitate when pressure drops below a certain value, called the onset pressure. As reservoir pressure decreases and drops below the onset pressure during hydrocarbon production, asphaltenes may precipitate then flocculate and deposit on formation rock, downhole equipment, and in production tubing. This can damage reservoir porosity, as well as plug off production equipment and the well itself. Wells with excessive asphaltene deposition may incur high remediation costs but, more importantly, are exposed to levels of formation damage that can greatly shorten the productive life of the well. Crudes may only contain a few tenths of a percent of asphaltenes. Most crudes are less than 20% asphaltenes.

It is a common practice in the oil industry to control mineral scale deposition in reservoir rock by "squeezing" a chemical inhibitor into the reservoir through injection down a well. Scale inhibitors are water soluble charged materials that commonly adsorb to the reservoir rock and are produced back only very slowly, while leaching enough of a steady stream of chemical into the reservoir fluids to inhibit scale formation. Asphaltene inhibitors, however, are typically oil soluble nonionic materials that have little or no affinity to adhere and/or adsorb to reservoir rock, so squeezing an asphaltene inhibitor into the reservoir will not provide extended protection against asphaltene deposition because the inhibitor will be rapidly depleted as the well is produced. Squeeze methods of deposition control, while well known in the industry for other problems, therefore lack the proper chemical inhibitors to be useful in the case of asphaltene control in subterranean reservoirs.

It would be desirable if new methods and asphaltene inhibitor compositions which were capable of adsorbing onto reservoir rock to enough of an extent as to extend the effective term of inhibition of asphaltenes during hydrocarbon production.

SUMMARY

There is provided, in one non-limiting embodiment, a method of inhibiting or preventing asphaltene deposition in a hydrocarbon fluid containing asphaltenes. The method comprising introducing to the hydrocarbon fluid an amount of asphaltene inhibitor effective to inhibit or prevent asphaltene deposition therein. The asphaltene inhibitor includes a reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups that include, but are not limited to, amines, esters, silanes, ketones, epoxides, alkoxides, aryloxides, halogens, alkali metals, alkali earth metals, acetamides, non-metal oxides, metal oxides and combinations thereof and co-reactants of the previous group, that is one previously specified in this sentence having a carbon chain length between 1 and 22. By alkoxides is meant moieties such as ethoxy, propoxy, butoxy, and the like; by aryloxides is meant moieties such as methylphenoxy, methylphenoxy acetate, and the like.

Additionally there is provided in an alternative non-restrictive embodiment, a method of inhibiting or preventing asphaltene deposition in a hydrocarbon fluid containing asphaltenes, wherein the fluid is within a subterranean formation. The method includes introducing a preflush of a chemical treatment into the subterranean formation, where the preflush composition comprises from about 0 to about 20 vol % of an asphaltene dispersant. The method also involves subsequently introducing an asphaltene inhibitor into the subterranean formation, where the asphaltene inhibitor includes a reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups that include, but are not necessarily limited to, amines, esters, silanes, ketones, epoxides, alkoxides, aryloxides, halogens, alkali metals, alkali earth metals, acetamides, non-metal oxides, metal oxides and combinations thereof, and where the co-reactant may be one of those previously specified, but also having a carbon chain lengths between 1 and 22. In the case that the subterranean formation produces a water cut of at least 1 vol %, the method includes subsequently introducing an overflush of a hydrophobic solvent that includes xylene, toluene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof. Alternatively, in the case that the subterranean formation produces a water cut of less than 1 vol %, the method includes subsequently introducing an overflush composition of water comprising from about 1 vol % to about 5 vol % of the volume of the previously "squeezed" asphaltene inhibitor followed by introducing a hydrophobic solvent that includes, but is not necessarily limited to xylene, toluene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof. In one non-limiting embodiment, the "squeeze" application introduces enough asphaltene inhibitor into the subterranean formation to permit crude oil production from the subterranean formation where a sufficient quantity of the asphaltene inhibitor remains within said formation for at least 30 days during the crude oil production to inhibit asphaltene deposition; alternatively for at least 90 days, and in another non-limiting embodiment for at least 120 days. With the method herein, sufficient asphaltene inhibitor chemical remains within the formation to inhibit asphaltene aggregation or deposition for a period that is 2 to 5 times longer than conventional asphaltene inhibitors injected into hydrocarbon bearing reservoirs can provide.

In still another non-limiting embodiment, there is provided a hydrocarbon fluid, e.g. crude oil, that comprises asphaltenes, but also comprises an effective amount of an asphaltene inhibitor to inhibit or prevent asphaltene deposition therein as compared to an otherwise identical hydrocarbon fluid not comprising the asphaltene inhibitor. Again, the asphaltene inhibitor includes a reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups that may include, but is not necessarily limited to, amine, esters, silanes, ketones, epoxides, alkoxides, aryloxides, halogens, alkali metals, alkali earth metals, acetamides, non-metal oxides, metal oxides and combinations thereof, and where the co-reactant optionally has a carbon chain length between 1 and 22.

There is additionally provided in an alternative non-restrictive embodiment asphaltene inhibitors of the reaction products previously described above.

DETAILED DESCRIPTION

Figure 1A:
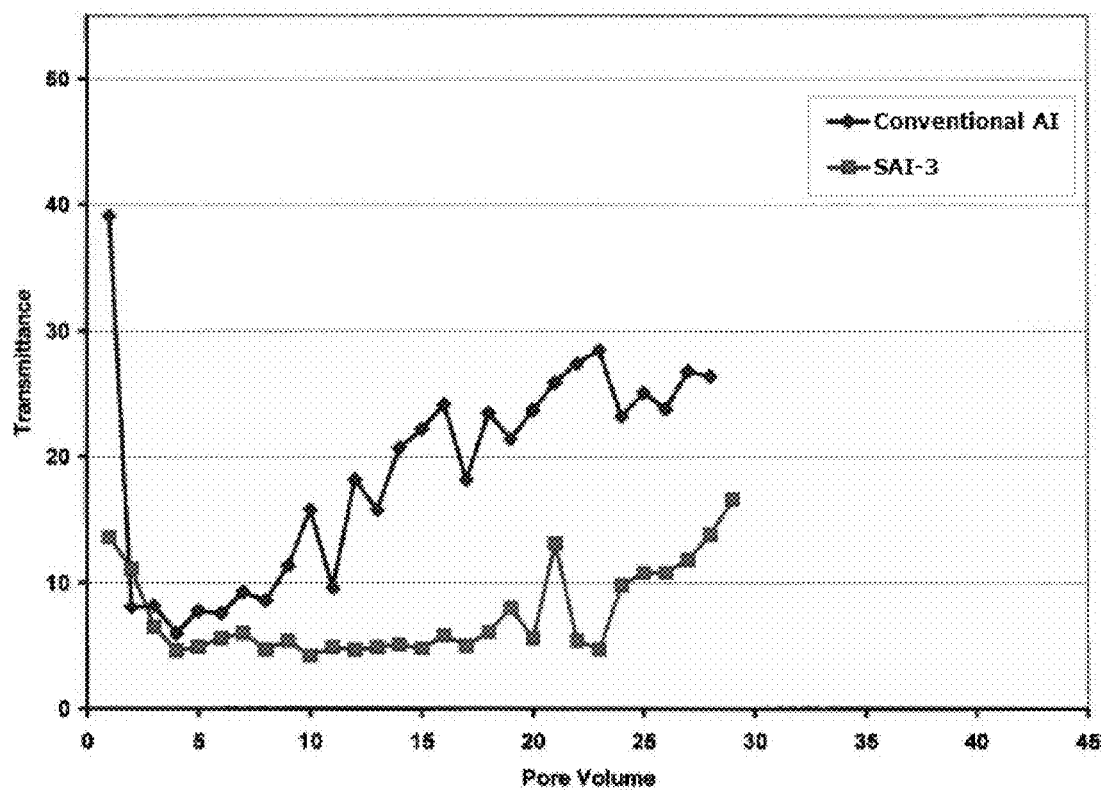
FIG. 1a is a graph presenting the percent light transmittance as a function of pore volume during two sand-packed column tests, one using conventional asphaltene inhibitor Commercial Inhibitor AI and the other using reaction product asphaltene inhibitor Squeeze Asphaltene Inhibitor 3 or SAI-3.

It has been discovered that a formulation of the reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups that include, but are not limited to amines, esters, silanes, ketones, epoxides, alkoxides (including methoxy and ethoxy), aryloxides, halogens, alkali metals, alkali earth metals, acetamides, non-metal oxides, and metal oxides optionally with one or more carbon chain lengths from 1 independently to 22 in certain solvents may function as an asphaltene inhibitor. Alternatively, the optional carbon chain lengths may range from 1 independently to 10. The word "independently" as used herein with respect to ranges means that any lower threshold may be combined with any upper threshold for the same range to give a suitable alternative range. Examples of suitable specific alkyl groups in the polymeric alkyl phenol formaldehyde resins include, but are not necessarily limited to butyl, amyl, octyl, nonyl, decyl, and dodecyl. Olefin maleic esters, alkyl acrolylates, and ethylene vinyl acetate are potential or optional chain backbones for the organic polymers herein.

In one non-limiting explanation, the co-reactants may be understood as "bridging agents" that bridge or connect the organic polymer molecules to the subterranean reservoir rock to improve retention within the reservoir.

In one non-limiting embodiment, the reaction may be between a polymeric alkyl phenol formaldehyde resin with silicon derivatives of the formula $SiR^1R^2R^3R^4$ where each $R''$ is independently selected from halogen, alkyl, O-alkyl, aryl and O-aryl groups, where the alkyl groups are straight or branched and the alkyl groups and aryl groups may have from 1 independently to 22 carbon atoms. Alternatively, the alkyl and aryl groups may have 1 independently to 12 carbon atoms. Examples of suitable specific co-reactants include, but are not necessarily limited to, tetraethoxy orthosilicate, methyltriethoxy silane, phenyltriethoxy orthosilicate, dimethyldiethoxy silane, diphenyldiethoxy silane, bis(triethoxysilyl) ethane, tetraethoxygermane, (triethoxysilyl)propyl aniline, hydroxyl-4-(3-triethoxysilylpropoxy) diphenylketone, and glycidyl-trimethylammonium chloride.

The functional groups of the co-reactant take part in the reaction to a degree of or in the proportion from 0.01 mole % independently to 90 mole %, alternatively in the range of 1 mole % independently to 64 mole %.

In the polymeric alkyl-substituted phenol formaldehyde resin, the alkyl substituent may be branched or linear from $C_2$ independently to $C_{32}$, alternatively from $C_1$ independently to $C_{12}$ and in another non-restrictive version $C_7$ independently to $C_{32}$. The polymeric alkyl-substituted phenol formaldehyde resin may have a weight average molecular weight of from about 1000 independently to about 30,000 daltons, and alternatively a suitable molecular weight range being from about 1300 independently up to about 12,000 daltons. These may be suitable molecular weight ranges and alkyl definitions for the organic polymers in general. As the molecular weight of the resin becomes large, the viscosity of the ensuing asphaltene inhibitor may become too high for it to be easily pumpable, especially within deepwater production systems with tied-back well networks. Thus, in some non-restrictive aspects, a relatively low molecular weight resin may be more suitable, for instance from about 1300 to about 7000 daltons.

The reaction product is typically formulated in a solvent that contains aromatic hydrocarbons, including, but not necessarily limited to, toluene, xylene, ethyl benzenes, aromatic naphthas, produced hydrocarbons, diesel, kerosene, unconventional solvents such as limonenes, turpentines, aliphatic hydrocarbons or polyethers, or other aromatic solvents and combinations thereof. In the asphaltene inhibitor formulation, the reaction product may be between about 10 wt % independently and about 90 wt % with the balance being solvent; alternatively between about 20 wt % independently to about 55 wt %.

The asphaltene inhibitor has the capacity to be tailored according to a given formation, production scenario, viscosity regime, production oil composition, and additional environmental or safety factors, within the parameters noted herein. This may be done by judicious selection of the polymeric alkyl phenol formaldehyde resin, solvent, and the co-reactant and its proportion in the reaction, which may be done by one having ordinary skill in the art using empirical methods.

The reaction to produce the reaction product herein may be conducted at elevated temperatures, between about 50° C. and about 200° C., at ambient pressure, without a catalyst, and in acid and base environments.

The effective amount of the asphaltene inhibitor introduced to the hydrocarbon fluid ranges from about 10 ppm independently to about 2000 ppm of the hydrocarbon fluid; alternatively, from about 25 ppm independently to about 1000 ppm of the hydrocarbon fluid; and in another non-limiting embodiment from about 50 independently to about 500 ppm. Asphaltene inhibitor concentrations between about 150 independently to about 500 ppm are not uncommon. These effective amounts are based on the hydrocarbon fluid present, and are independent of any water present.

The hydrocarbon fluid may be crude oil or a combination of crude oil, formation brine and hydrocarbon gases.

As noted, it has been discovered that the asphaltene inhibitor formulation has particular application when squeezed into an oil-bearing subterranean formation because enough of the asphaltene inhibitor remains within the formation even after oil production commences to give extended protection. The asphaltene inhibitor within the formation may thus inhibit or prevent the deposit or precipitation of the asphaltenes at or near their source or origin.

During the "squeeze" application of the asphaltene inhibitor formulation, the following steps may be followed in one non-limiting embodiment. (1) A preflush of a chemical treatment such as toluene, xylene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof with 0-20 wt % of an asphaltene dispersant may be introduced. Suitable asphaltene dispersants include, but are not necessarily limited to, dodecylbenzene sulfonic acid (DDBSA) and naphthalene sulfonic acids, other organic sulfonates, soaps, and surfactants. (2) The preflush is followed by pumping a predetermined volume of the reaction product asphaltene inhibitor composition into the formation (in one non-limiting embodiment from about 1 to 75 barrels not including the dilution and/or carrier phase); the volume of pumped inhibitor is determined by oil, well, formation, and production characteristics. (3) In cases of wells with at least 1 vol % water cut, the pumping of the reaction product asphaltene inhibitor composition is followed by an overflush of toluene, xylene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof. For wells with less than 1 vol % water cut, the overflush is begun with water in the volume of from 1 vol % to 5 vol % of the volume of the previously "squeezed" reaction product asphaltene inhibitor composition followed by several volumes of toluene, xylene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof.

The method of inhibiting or preventing asphaltene deposition or precipitation in the squeeze application embodiment works via adsorption to or complexing with formation surfaces, in one non-limiting theory of the method. Alternatively, the method may work by forming cross linkages between the asphaltene inhibitor molecules or between the inhibitor molecules and the formation. The adsorption, cross linkage or complexing may be aided by water, either water present in the formation or water injected into the overflush, over a wide pH range such as from about 1 independently to about 12; alternatively from about 1 independently to about 8, and in another non-restrictive version from about 2 independently to about 7. Due to the affinity of the coreactant functionality of the asphaltene inhibitor for the reservoir rock, the adsorbed, crosslinked or complexed material desorbs slowly back into the oil and takes a considerably long time to desorb into the oil completely. Such complete desorption may take as long as about 6 months, but this estimate is heavily dependent on the oil, well, formation, and production characteristics. This property of the asphaltene inhibitors is believed to be unique and makes it a squeeze asphaltene inhibitor with a long squeeze life. In one non-limiting embodiment, the "squeeze" application introduces enough asphaltene inhibitor into the subterranean formation to permit crude oil production from the subterranean formation where a sufficient quantity of the asphaltene inhibitor remains within said formation for at least twice as long as a conventional asphaltene inhibitor would remain. Again, with this method, sufficient asphaltene inhibitor chemical remains within the formation to inhibit asphaltene aggregation during production periods that are about 2 to 5 times longer than conventional asphaltene inhibitors injected into hydrocarbon bearing reservoirs. The invention will now be illustrated with respect to certain examples, which are not intended to limit the invention, but instead to more fully describe it.

EXAMPLES 1-5

The reaction products described herein were tested on a crude oil from Prudhoe Bay, Ala., at a dosage of 500 ppm to determine their performance as asphaltene inhibitors on a precipitation test where a low transmittance and high "% Dispersion" are indications of good inhibition of precipitation. Results were compared to Baker Hughes Commercial Inhibitor AI as the performance standard. The results are shown in Table I below. It is evident from the data that the performance of the conventional inhibitor AI and three different modified forms of the asphaltene inhibitor made herein are similar. This shows that the reaction products by themselves are good asphaltene inhibitors.

TABLE I

Comparative Performance of Conventional AI and New Squeeze Asphaltene Inhibitors

| Ex. | Inhibitor | % Transmittance | % Dispersion |
|---|---|---|---|
| 1 | Blank | 43.9 | — |
| 2 | Commercial Inhibitor AI | 11.9 | 72.9 |
| 3 | Squeeze Asphaltene Inhibitor 1 (SAI-1) | 13.4 | 69.5 |
| 4 | Squeeze Asphaltene Inhibitor 2 (SAI-2) | 13.2 | 69.9 |
| 5 | Squeeze Asphaltene Inhibitor 3 (SAI-3) | 13.5 | 69.3 |

Note to Table 1:
Asphaltene inhibition performance data with inhibitor chemistries distributed at a concentration of 500 ppm within a Prudhoe Bay oil. Transmittance and dispersion data gathered from heptane precipitation test and collimated light at 830 nm.

Commercial Inhibitor AI was a Nonylphenol Resin.

Squeeze Asphaltene Inhibitor SAI-1 was made by reacting 97 wt % nonylphenol resin with 1 wt % DDBSA and with 1 wt % of tetraethyl orthosilicate in a balance of an aromatic solvent.

Squeeze Asphaltene Inhibitor SAI-2 was made by reacting 96 wt % nonylphenol resin with 1 wt % DDBSA and with 2 wt % of tetraethyl orthosilicate in a balance of an aromatic solvent.

Squeeze Asphaltene Inhibitor SAI-3 was made by reacting 95 wt % nonylphenol resin with 1 wt % DDBSA and with 3 wt % of tetraethyl orthosilicate in a balance of an aromatic solvent.

Squeeze Asphaltene Inhibitor SAI-4 was made by reacting 94 wt % nonylphenol resin with 1 wt % DDBSA and with 4 wt % of methyltriethoxy silane in a balance of an aromatic solvent.

Squeeze Asphaltene Inhibitor SAI-5 was made by reacting 94 wt % nonylphenol resin with 1 wt % DDBSA and with 4 wt % of phenyltriethoxy silane in a balance of an aromatic solvent.

Squeeze Asphaltene Inhibitor SAI-6 was made by reacting 94 wt % nonylphenol resin with 1 wt % DDBSA and with 4 wt % dimethyldiethoxy silane in a balance of an aromatic solvent.

Squeeze Asphaltene Inhibitor SAI-7 was made by reacting 94 wt % nonylphenol resin with 1 wt % DDBSA and with 4 wt % diphenyldiethoxy silane in a balance of an aromatic solvent.

Figure 1B:
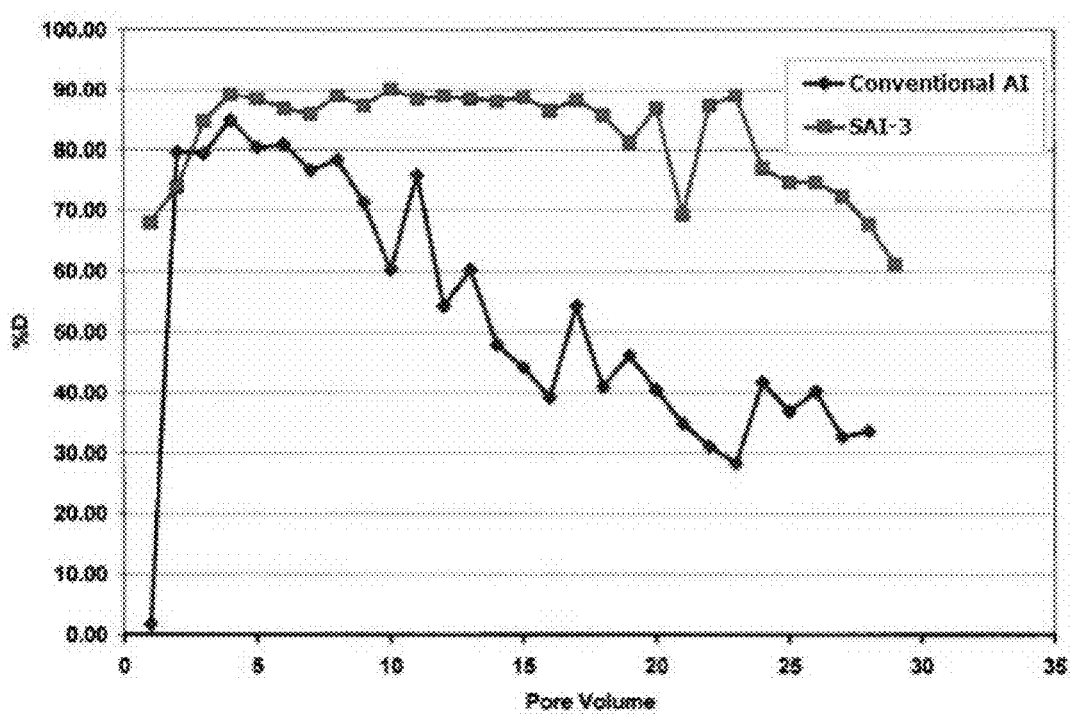
FIG. 1b is a graph showing the percent dispersion as a function of pore volume during two sand-packed column tests, one using Commercial Inhibitor AI and the other using reaction product asphaltene inhibitor SAI-3.
Figure 2:
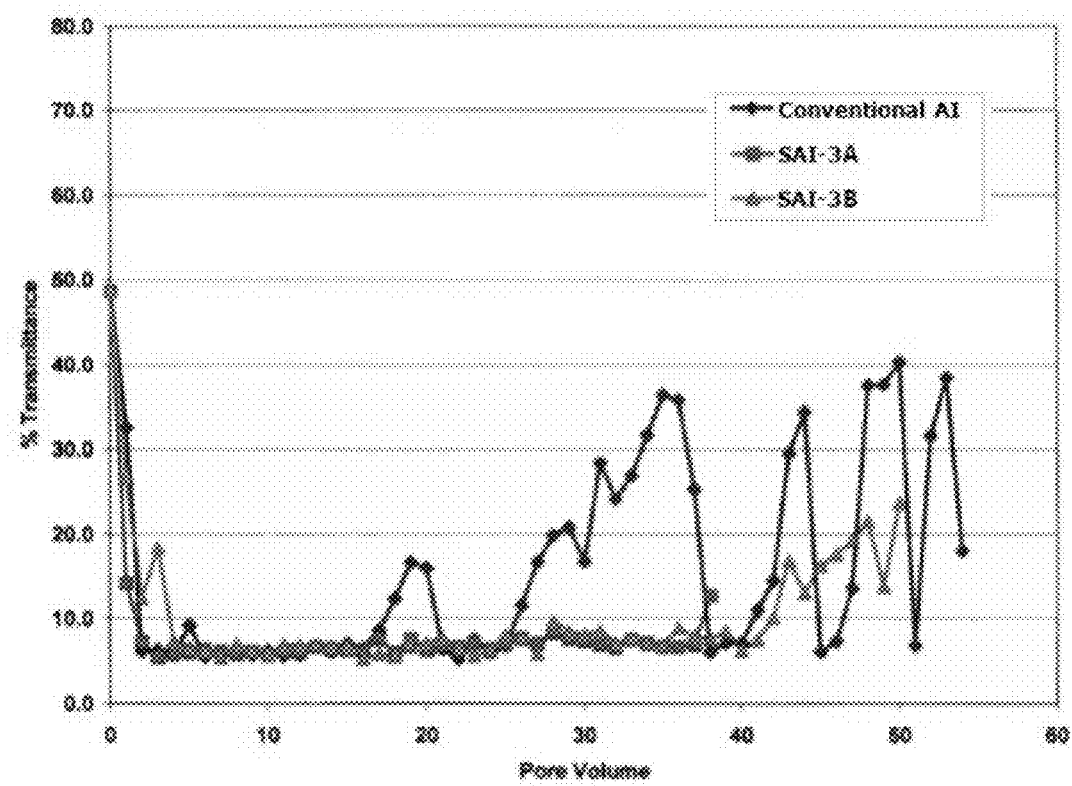
FIG. 2 is a graph presenting the percent light transmittance as a function of pore volume during three core-flood tests, one using conventional Commercial Inhibitor AI, the next using reaction product asphaltene inhibitors SAI-3A, and SAI-3B, both being trials of the reaction product SAI-3.

FIGS. 1a and 1b present the flow back pattern on a sandstone packed column (and hence the retention rate of the asphaltene inhibitor in the formation) of the asphaltene inhibitor SAI-3 described herein compared to Commercial Inhibitor AI. It is apparent that the squeeze life is improved by a factor of about three (3) over that of the conventional asphaltene inhibitor. FIG. 2 shows the flowback pattern in a sandstone core. While the concentration of Commercial Inhibitor AI decreases after only 15 pore volumes, the concentration of the squeeze asphaltene inhibitor SAI-3 during two trials remains constant and consistent until about 40 pore volumes, again roughly three (3) times longer than the commercial inhibitor. This result confirms the finding for the sand packed column experiments.

Figure 3:
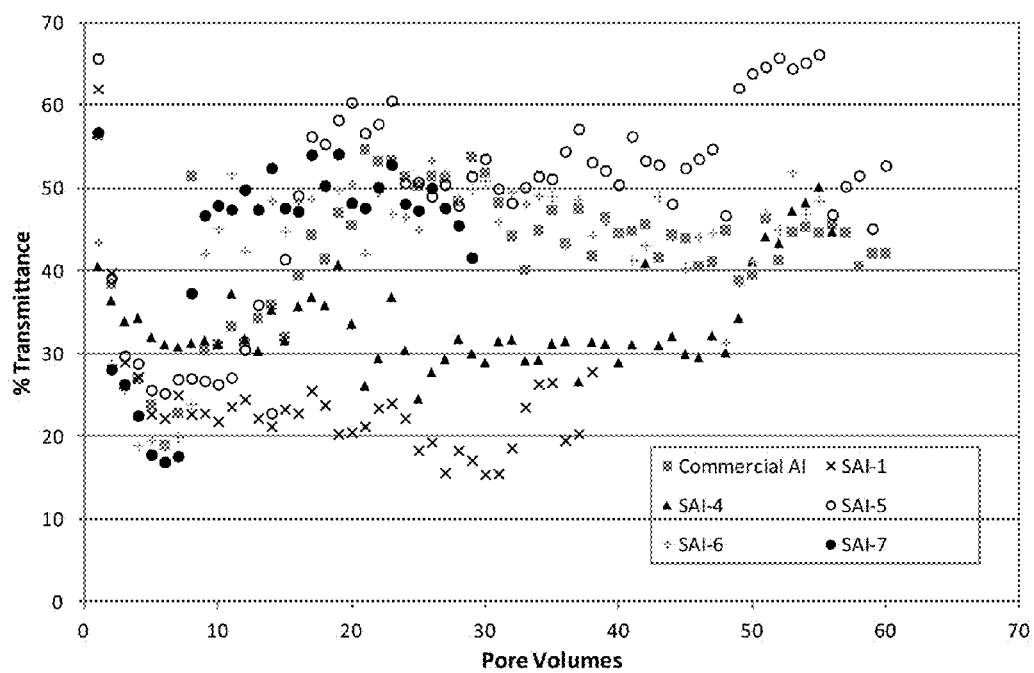
FIG. 3 is a graph presenting the percent light transmittance as a function of pore volume during six sand-packed column tests, one using conventional asphaltene inhibitor Commercial AI, one using the reaction product asphaltene inhibitor SAI-1, one using the reaction product asphaltene inhibitor SAI-4, one using the reaction product asphaltene inhibitor SAI-5, one using the reaction product asphaltene inhibitor SAI-6, and one using the reaction product asphaltene inhibitor SAI-7.

FIG. 3 displays data from additional sandstone packed column tests during which the Commercial AI demonstrated a shorter retention time within the column than the retention times associated with SAI-1 and SAI-4 chemistries. Other chemistries, namely SAI-5, SAI-6, and SAI-7, showed minimal retention time enhancement relative to the Commercial AI, but these results indicate that other co-reactants do not adversely impact chemical retention and inhibitor activity.

Figure 4A:
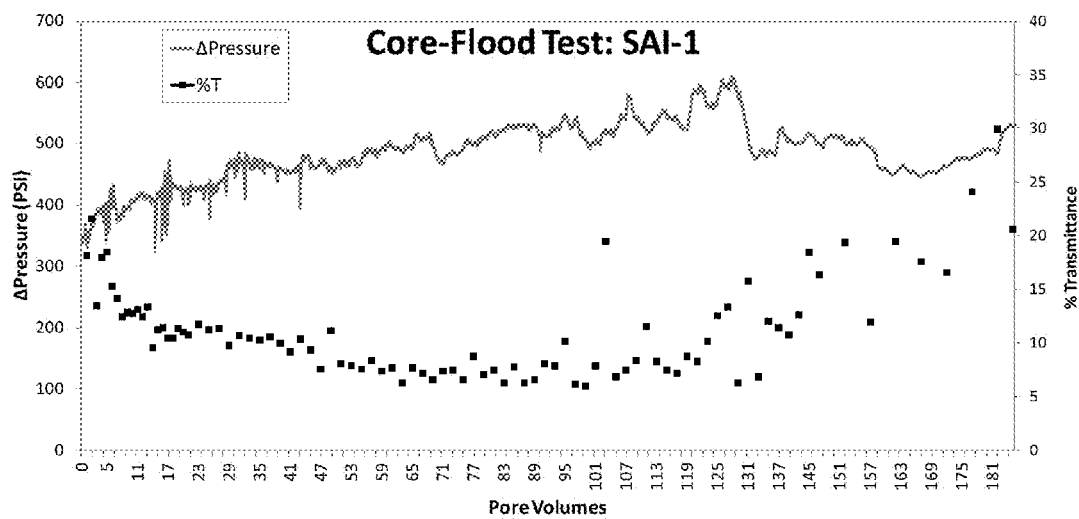
FIG. 4a is a graph presenting the percent light transmittance and differential pressure as a function of pore volume in a core-flood test using reaction product asphaltene inhibitor SAI-1.
Figure 4B:
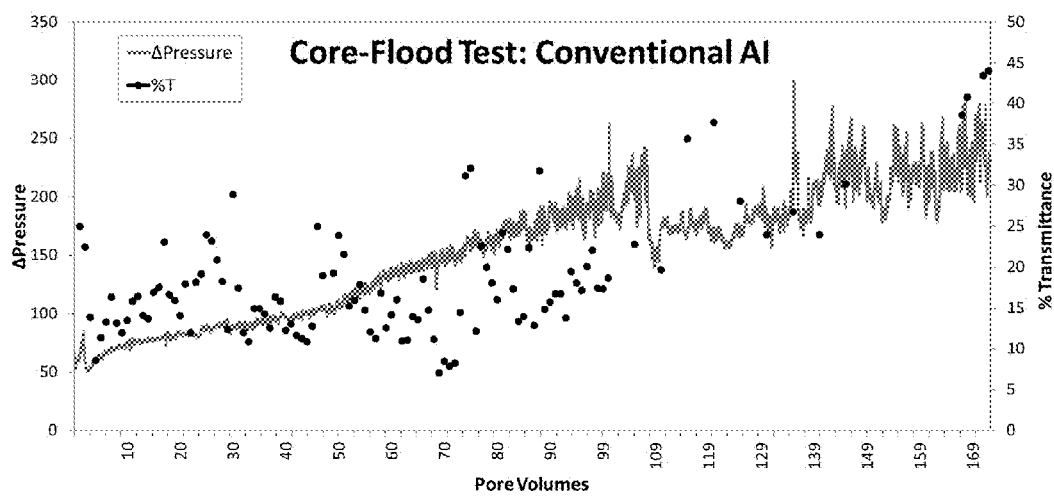
FIG. 4b is a graph presenting the percent light transmittance and differential pressure as a function of pore volume in a core-flood test using conventional Commercial AI.
Figure 4C:
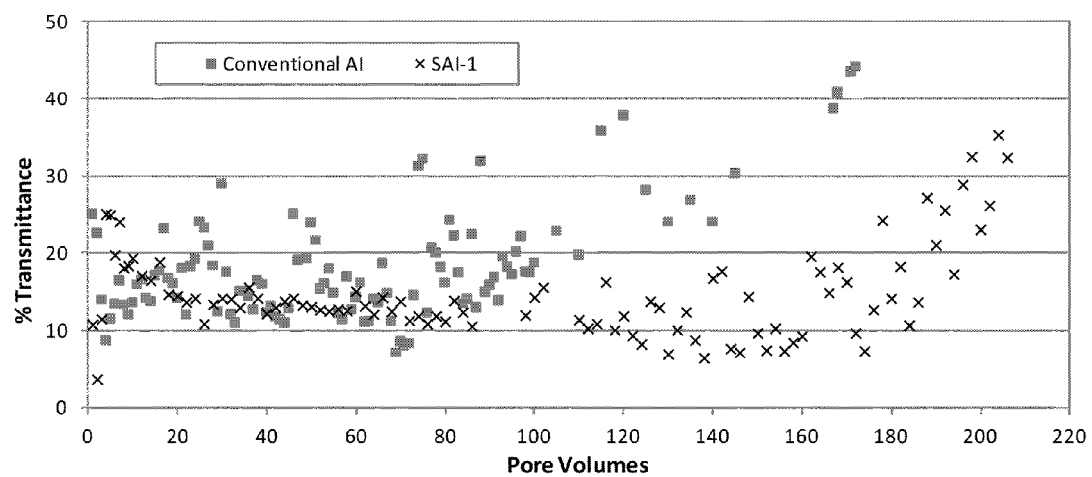
FIG. 4c is a graph presenting the percent light transmittance data as a function of pore volume for the two core-flood tests detailed in FIGS. 4a & 4b, during which the reaction product asphaltene inhibitor SAI-1 and conventional Commercial AI chemistries were used, respectively.

FIGS. 4a and 4b display differential pressure and heptane precipitation transmittance data for two core-flood tests. The core-flood test detailed within FIG. 4a consisted of imbibing the oil field core sample with the SAI-1 chemistry and then flooding said core sample with oil from the corresponding oil reservoir; similarly, the core-flood test detailed within FIG. 4b used Conventional AI and an analogous core sample from the same oil field along with the same crude oil. FIG. 4c displays the two core-flood tests transmittance data on the same graph for easy comparison, and this plot illustrates that SAI-1 has about a twice to thrice as long retention time within the core sample as does the Conventional AI.

Many modifications may be made in the methods of and compositions of this invention without departing from the scope thereof. For example, different organic polymers, polymeric alkyl phenol formaldehyde resins, co-reactants, solvents, hydrocarbons, asphaltene dispersants, diluents, and different proportions and reaction conditions may be used from those described or exemplified, and still be within the scope of the invention. Additionally, the squeeze injection or introduction procedure described herein may be varied from that described and exemplified and still be within the scope of the invention as set out herein. Furthermore, the asphaltene inhibitors described herein are expected to be useful in hydrocarbons other than the specific crude oils exemplified herein.

The present invention may suitably comprise, consist or consist essentially of the elements disclosed and may be practiced in the absence of an element not disclosed. For instance, in the method of inhibiting or preventing asphaltene deposition in a hydrocarbon fluid containing asphaltenes, the method may consist of or consist essentially of introducing to the hydrocarbon fluid an amount of asphaltene inhibitor effective to inhibit or prevent asphaltene deposition therein, where the asphaltene inhibitor consists of or consists essentially of a reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups selected from the group consisting of amines, esters, silanes, ketones, epoxides, alkoxides, aryloxides, halogens, alkali metals, alkali earth metals, acetamides, non-metal oxides, metal oxides and combinations thereof where the co-reactant optionally has one or more carbon chain lengths between 1 and 22, and a solvent as described herein.

In another non-limiting instance, in a method of inhibiting or preventing asphaltene deposition in a hydrocarbon fluid containing asphaltenes within a subterranean formation, the method may consist of or consist essentially of introducing a preflush of a hydrophobic solvent into the subterranean formation, where the preflush may or may not comprise about 0 to about 20 vol % of an asphaltene dispersant. The method may additionally consist of or consist essentially of subsequently introducing an asphaltene inhibitor into the subterranean formation, where the asphaltene inhibitor consists of or consists essentially of a reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups selected from the group consisting of amines, esters, silanes, ketones, epoxides, alkoxides, halogens, alkali metals, alkali earth metals, acetamides, non-metal oxides, metal oxides and combinations thereof where the co-reactant optionally has one or more carbon chain lengths between 1 and 22 and a solvent. The method may further consist of or consist essentially of a subsequent introduction selected from the group consisting of in the case that the subterranean formation produces a water cut of at least 1 vol %, subsequently introducing an overflush of a hydrophobic solvent selected from the group consisting of toluene, xylene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof, yet in the case that the subterranean formation produces a water cut of less than 1 vol %, subsequently introducing an overflush of water comprising from about 1 vol % to about 5 vol % of the volume of the previously "squeezed" reaction product asphaltene inhibitor followed by introducing a hydrophobic solvent selected from the group consisting of toluene, xylene, ethylbenzenes, aromatic naphthas, produced hydrocarbons, diesel, kerosene, unconventional solvents such as limonenes, turpentines, aliphatic hydrocarbons or polyethers, or other aromatic solvents and combinations thereof.

In a different, non-restrictive instance, a hydrocarbon fluid (crude oil, in a non-limiting embodiment) is described that contains asphaltenes, and an effective amount of an asphaltene inhibitor to inhibit or prevent asphaltene deposition therein as compared to an otherwise identical hydrocarbon fluid not comprising the asphaltene inhibitor, where the asphaltene inhibitor consists of or consists essentially of a reaction product of an organic polymer which inhibits the precipitation of asphaltenes selected from the group including, but not limited to, alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters and alkyl polyacrylate esters, with a co-reactant having functional groups selected from the group consisting of amines, esters, silanes, ketones, epoxides, alkoxides, aryloxides, halogens, alkali metals, alkali earth metals, acetamides, non-metal oxides, metal oxides and combinations thereof where the co-reactant may optionally have one or more carbon chain lengths between 1 and 22.

The words "comprising" and "comprises" as used herein throughout the claims, are to be interpreted as "including but not limited to" and "includes but not limited to".

What is claimed is:

1. A method of inhibiting or preventing asphaltene deposition in a hydrocarbon fluid containing asphaltenes, the hydrocarbon fluid initially being within a subterranean formation, the method comprising:
   introducing to the hydrocarbon fluid from about 10 ppm to about 2000 ppm, based on the hydrocarbon fluid, independent of any water present, of asphaltene inhibitor effective to inhibit or prevent asphaltene deposition therein, where the asphaltene inhibitor comprises a reaction product of:
   an organic polymer which inhibits the precipitation of asphaltenes, where the organic polymer is selected from the group alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters, alkyl polyacrylate esters, and combinations therein, with
   a co-reactant having functional groups selected from the group consisting of amines, esters, silanes, ketones, epoxides, alkoxides, aryloxides, halogens, alkali metals, alkali earth metals, acetamides, non-metal oxides, metal oxides and combinations thereof and where the co-reactant is one previously specified having a carbon chain length between 1 and 22 carbons; and
   adsorbing, crosslinking, or complexing the asphaltene inhibitor with reservoir rock of the subterranean formation in the presence of water.

2. The method of claim 1, where the organic polymer is a polymeric alkylphenol formaldehyde resin.

3. The method of claim 2 where the polymeric alkylphenol formaldehyde resin may have a weight average molecular weight of from about 1000 to about 30,000 daltons.

4. The method of claim 1 where the co-reactant is a silicon derivative of the formula $SiR^1R^2R^3R^4$ where each $R''$ is independently selected from halogen, alkyl, O-alkyl, aryl, and O-aryl groups; where the alkyl groups are straight or branched and the alkyl groups and aryl groups may have from 1 to 22 carbon atoms.

5. The method of claim 1 where the organic polymer is a polymeric alkylphenol formaldehyde resin; and the co-reactant is a silicon derivative of the formula $SiR^1R^2R^3R^4$ where each $R''$ is independently selected from halogen, alkyl, O-alkyl, aryl, and O-aryl groups; where the alkyl groups are straight or branched and the alkyl groups and aryl groups may have from 1 to 22 carbon atoms.

6. The method of claim 5 where functional groups of the co-reactant take part in the reaction to a degree of from about 0.01 mole % to about 90 mole %.

7. The method of claim 1 where the asphaltene inhibitor is present in a solvent in a proportion of from about 10 wt % to about 90 wt %, the balance being a hydrophobic solvent selected from the group consisting of toluene, xylene, ethylbenzenes, aromatic naphthas, produced hydrocarbons, diesel, kerosene, unconventional solvents such as limonenes, turpentines, aliphatic hydrocarbons, polyethers, and combinations thereof.

8. The method of claim 1 where the hydrocarbon fluid is selected from the group consisting of crude oil and a combination of crude oil, formation brine, and hydrocarbon gases.

9. A method of inhibiting or preventing asphaltene deposition in a hydrocarbon fluid containing asphaltenes, the hydrocarbon fluid initially being within a subterranean formation, the method comprising:
   introducing from about 10 ppm to about 2000 ppm, based on the hydrocarbon fluid, independent of any water present, an asphaltene inhibitor into the subterranean formation, where the asphaltene inhibitor comprises a reaction product of:

an organic polymer which inhibits the precipitation of asphaltenes, where the organic polymer is selected from the group alkylphenol formaldehyde resins, alkylphenol formaldehyde amine resins, polyalkylsuccinic anhydrides, polyalkylsuccinic anhydride pentaerythritol condensate polymers, maleic anhydride alpha olefin polyesters, maleic anhydride fatty amine polyamides, sorbitan polyesters, alkyl polyacrylate esters, and combinations therein, with a co-reactant having functional groups selected from the group consisting of amines, esters, silanes, ketones, epoxides, alkoxides, aryloxides, halogens, alkali metals, alkali earth metals, acetamides, nonmetal oxides, metal oxides and combinations thereof and where the co-reactant is one previously specified having a carbon chain length between 1 and 22 carbons; and adsorbing, crosslinking, or complexing the asphaltene inhibitor with reservoir rock of the subterranean formation in the presence of water;

further comprising after introducing the asphaltene inhibitor, subsequently introducing selected from the group consisting of:

in the case that the subterranean formation produces a water cut of 1 vol % and greater, subsequently introducing an overflush of a hydrophobic solvent selected from the group consisting of toluene, xylene, ethylbenzenes, aromatic naphthas, produced hydrocarbons, diesel, kerosene, unconventional solvents such as limonenes, turpentines, aliphatic hydrocarbons or polyethers, and combinations thereof; and in the case that the subterranean formation produces a water cut of less than 1 vol %, subsequently introducing an overflush of water comprising from about 1 vol % to about 5 vol % of the asphaltene inhibitor previously injected into the formation followed by introducing a hydrophobic solvent selected from the group consisting of toluene, xylene, ethylbenzenes, aromatic naphthas, produced hydrocarbons, diesel, kerosene, unconventional solvents such as limonenes, turpentines, aliphatic hydrocarbons or polyethers, and combinations thereof.

10. The method of claim 9 further comprising, prior to introducing the asphaltene inhibitor, introducing a preflush chemical treatment into the subterranean formation, where the preflush fluids comprise about 0 to about 20 vol % of an asphaltene dispersant and the balance being a hydrophobic solvent selected from the group consisting of toluene, xylene, ethylbenzenes, aromatic naphthas, produced hydrocarbons, diesel, kerosene, unconventional solvents such as limonenes, turpentines, aliphatic hydrocarbons, polyethers, and combinations thereof.

11. The method of claim 9 where the co-reactant is a silicon derivative of the formula $SiR^1R^2R^3R^4$ where each $R''$ is independently selected from halogen, alkyl, O-alkyl, aryl, and O-aryl groups; where the alkyl groups are straight or branched and the alkyl groups and aryl groups may have from 1 to 22 carbon atoms.

12. The method of claim 11 where functional groups of the co-reactant takes part in the reaction to a degree of from about 0.01 mole % to about 90 mole %.

13. The method of claim 9 where water in the formation ranges in pH from about 1 to about 12.

* * * * *